United States Patent
Chia

(10) Patent No.: US 7,979,025 B2
(45) Date of Patent: Jul. 12, 2011

(54) METHOD AND APPARATUS FOR HANDOVER IN A WIRELESS COMMUNICATION DEVICE BETWEEN WIRELESS DOMAINS

(75) Inventor: Si Tak Stanley Chia, Walnut Creek, CA (US)

(73) Assignee: Vodafone Group, PLC, Newbury (GB)

( * ) Notice: Subject to any disclaimer, the term of this patent is extended or adjusted under 35 U.S.C. 154(b) by 428 days.

(21) Appl. No.: 11/098,953

(22) Filed: Apr. 5, 2005

(65) Prior Publication Data

US 2006/0223536 A1  Oct. 5, 2006

(51) Int. Cl.
*H04B 7/00* (2006.01)
*H04W 36/00* (2009.01)

(52) U.S. Cl. ........................ 455/41.2; 455/436

(58) Field of Classification Search ............. 455/41.2, 455/406, 550.1, 552.1, 456.1–456.6, 436, 455/435.1–435.3, 41.1; 370/329, 328, 230, 370/235, 352, 332
See application file for complete search history.

(56) References Cited

U.S. PATENT DOCUMENTS

| | | | |
|---|---|---|---|
| 6,490,443 B1* | 12/2002 | Freeny, Jr. | 455/406 |
| 6,549,768 B1* | 4/2003 | Fraccaroli | 455/456.3 |
| 6,980,527 B1* | 12/2005 | Liu et al. | 370/280 |
| 2002/0077104 A1* | 6/2002 | Chen et al. | 455/436 |
| 2003/0036374 A1* | 2/2003 | English et al. | 455/403 |
| 2005/0048972 A1* | 3/2005 | Dorenbosch et al. | 455/436 |
| 2006/0116127 A1* | 6/2006 | Wilhoite et al. | 455/442 |

* cited by examiner

*Primary Examiner* — Melody Mehrpour
(74) *Attorney, Agent, or Firm* — Moser IP Law Group

(57) ABSTRACT

A method and apparatus for handover in a wireless communication device between wireless domains is described. In one example, a signal employing a short-range wireless protocol is detected at the wireless communication device. For example, the short-range wireless protocol may be a near-field communication (NFC) protocol, a radio frequency identification (RFID) protocol, an optical protocol, a BLUETOOTH protocol, and the like known in the art. A handover is requested from the first wireless domain to the second wireless domain in response to the detected signal. In one example, the signal may be broadcast by an access control system to a building and may be configured to control access to the building. In this manner, precise delineation of the handover boundary between wireless domains is provided.

20 Claims, 4 Drawing Sheets

METHOD AND APPARATUS FOR HANDOVER IN A WIRELESS COMMUNICATION DEVICE BETWEEN WIRELESS DOMAINS

BACKGROUND OF THE INVENTION

1. Field of the Invention

The present invention generally relates to wireless communication systems and, more particularly, to a method and apparatus for handover in a wireless communication device between wireless domains.

2. Description of the Related Art

The field of wireless communications has become increasingly important in today's society. One area associated with wireless communications relates to a handover process in a wireless communication device (also referred to as a handoff process). In general, a handover process refers to a scenario in which wireless communication is passed from one wireless base station to another base station, including those within one wireless domain or across multiple wireless domains. A handover is generally a response to geographic movement by a mobile station between wireless base stations as driven by movement across base stations within or across domains. For example, a handover may occur between base stations of a cellular network or between different cellular networks. In another example, a handover may occur between an outdoor wireless domain (e.g., a macro-cellular network) and an indoor wireless domain (e.g., a micro-cellular network or an indoor wireless local area network).

One technique for triggering handovers employs signal level comparisons between wireless domains at the wireless communication device and/or the base stations in communication with the wireless communication device. Signal level based handovers, however, are not reliable, especially when the base stations are deployed close to each other. For example, signal levels can fluctuate significantly due to multipath propagation, as well as system loading. Another technique for triggering handovers involves manual network selection. That is, the user must select the particular wireless domain with which to communicate. Manual network selection, however, is cumbersome, as the user needs to consciously perform network selection using the wireless communication device. Accordingly, there exists a need in the art for an improved method and apparatus for handover in a wireless communication device between wireless domains.

SUMMARY OF THE INVENTION

A method and apparatus for handover in a wireless communication device between wireless domains is described. In one embodiment, a signal employing a short-range wireless protocol is detected at the wireless communication device. For example, the short-range wireless protocol may be a near-field communication (NFC) protocol, a radio frequency identification (RFID) protocol, a BLUETOOTH protocol, an ultra-wideband (UWB) protocol, an optical protocol, a wireless local area network protocol, and the like known in the art. A handover is requested from the first wireless domain to the second wireless domain in response to the detected signal. In one embodiment, the signal may be broadcast by an access control system to a building and may be configured to control access to the building, or to specific parts of a building, or to a campus. In this manner, precise delineation of the handover boundary between wireless domains is provided.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

Method and apparatus for handover in a wireless communication device between wireless domains is described. Handover between wireless domains is triggered in response to communication with a proximity communication system at the wireless device. In one embodiment, the wireless device requests a handover between wireless domains in response to detecting one or more proximity communication signals either through passive reception or via an active dialogue (i.e., transmit and respond sequence). This enables more precise delineation of handover boundaries when compared with signal-level handover techniques.

Figure 1:
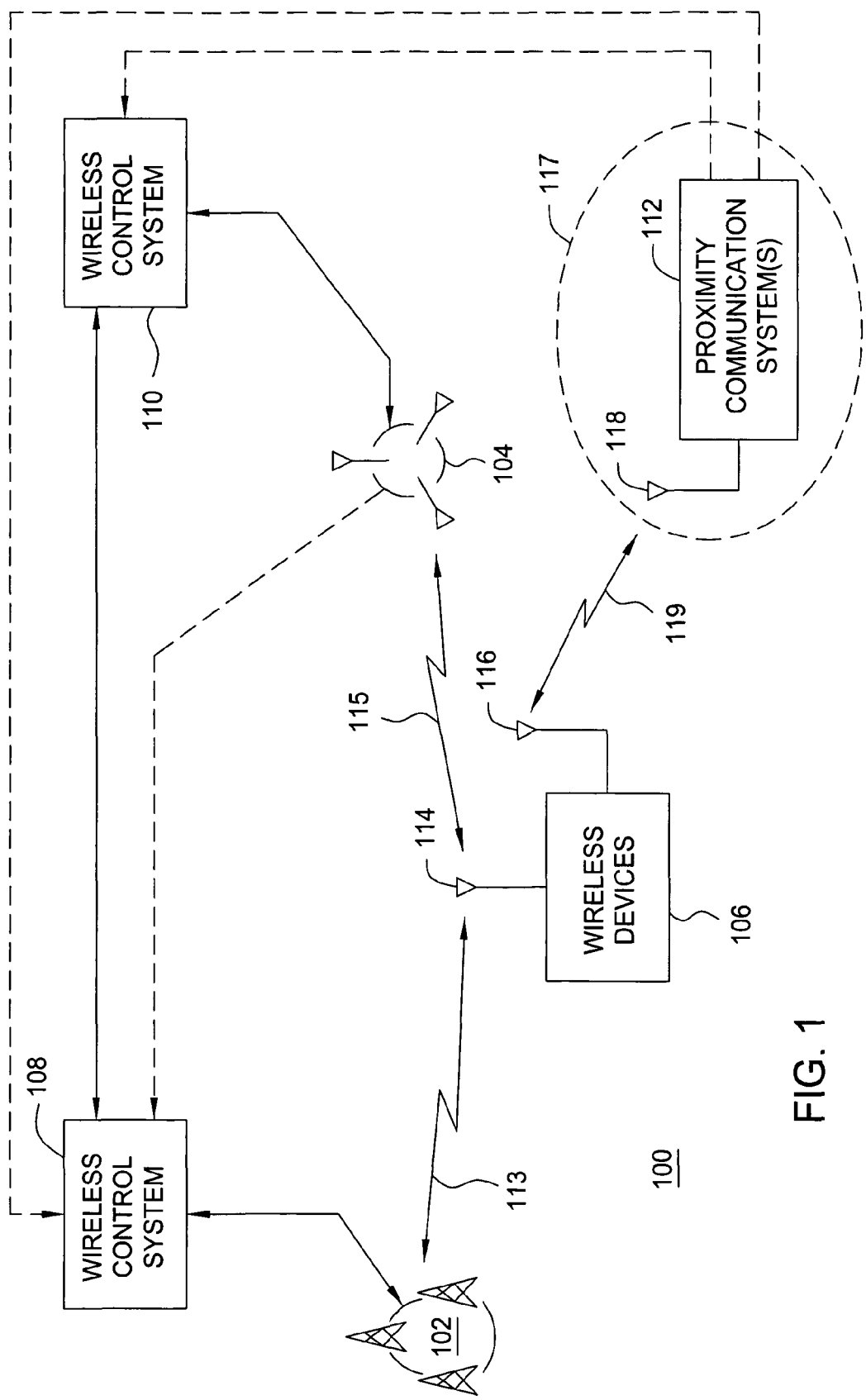
FIG. 1 is a block diagram depicting an exemplary embodiment of a wireless communication system constructed in accordance with one or more aspects of the invention.

FIG. 1 is a block diagram depicting an exemplary embodiment of a wireless communication system 100 constructed in accordance with one or more aspects of the invention. The system 100 illustratively includes wireless domains 102 and 104, wireless control systems 108 and 110, a wireless device 106, and a proximity communication system 112. The wireless device 106 includes an antenna 114 for establishing both a wireless link 113 for communication with the wireless domain 102 and a wireless link 115 for communication with the wireless domain 104. The wireless device 106 further includes an antenna 116 for establishing a wireless link 119 for communication with the proximity communication system 112. The wireless domains 102 and 104 may comprise any type of wireless communication network known in the art. The wireless domains 102 and 104 may be of the same type or may be of different types. The wireless device 106 may comprise a cellular telephone, personal digital assistant (PDA), portable computer, or like type device configured for one or more types of wireless communication. An exemplary embodiment of the wireless device 106 is described below with respect to FIG. 2. In operation, the wireless device 106 may handover from one of the wireless domains 102 and 104 to the other. The system 100 advantageously uses communication between the wireless device 106 and the proximity communication system 112 to trigger the handover.

In particular, in one embodiment, the wireless domain 102 comprises a cellular communication network. For example, the wireless domain 102 may comprise a global system for mobile communications (GSM) network, a code division multiple access (CDMA) network, a universal mobile telecommunications system (UMTS) network, a personal digital cellular (PDC) network, or like type cellular communication network known in the art. The wireless control system 108 controls the wireless domain 102. For example, if the wireless domain 102 comprises a GSM network, the wireless control system 108 comprises base station controllers (BSCs), mobile switching centers (MSCs), and like type network elements for facilitating communication between the wireless domain 102 and the wireless device 106. Cellular communication networks and their operation and control are well known in the art.

The wireless domain 104 may comprise a cellular communication system or other type of wireless communication system, such as a wireless local area network (WLAN). In one embodiment, the wireless domain 104 is controlled separately from the wireless domain 102 by the wireless control system 110. For example, if the wireless domain 104 comprises a WLAN, the wireless control system 108 comprises servers, switches, routers, and like type network elements for facilitating wireless communication. The wireless domain 104 may also comprise another type of cellular system. For example, the wireless domain 102 may be a GSM network and the wireless domain 104 may be a UMTS network. The wireless control system 110 may be in communication with the wireless control system 108 to facilitate handover between the wireless domains 102 and 104.

Alternatively, the wireless domain 104 may be controlled by the wireless control system 108, obviating the need for the wireless control system 110. For example, the wireless domain 104 may be part of the same network as that of the wireless domain 102, but may be logically separated from the wireless domain 102 based on one or more attributes. That is, a service provider may have different fee structures for use of the wireless domain 102 versus the wireless domain 104, the wireless domain 104 may have a different cellular configuration than that of the wireless domain 102 (e.g., smaller, denser cells for indoor operation), and the like.

The proximity communication system 112 is configured for short-range wireless communication with the wireless device 106. The proximity communication system 112 includes an effective communication zone, which is generally referred to as a service area 117 or "localized zone". The service area 117 is defined such that the wireless device 106 is capable of transmitting signals to and/or receiving signals from the proximity communication system 112. In one embodiment, the proximity communication system 112 employs a near-field communication (NFC) protocol for wireless communication with the wireless device 106. The NFC protocol is a peer-to-peer communication protocol for establishing connections between electronic devices. The NFC protocol may operate in both the regulated and the unregulated radio frequency (RF) band of 13.56 MHz or other frequency bands. The NFC protocol typically operates over distances between 0 and 20 centimeters. The NFC protocol is well known in the art and thus further details are omitted for clarity. Those skilled in the art will appreciate that other types of short-range wireless communication protocols may be used by the invention, such as a radio frequency identification (RFID) protocol, a BLUETOOTH protocol, an ultra-wideband (UWB) protocol, and like type RF protocols known in the art, as well as infrared protocols and like type optical protocols known in the art. In addition, the proximity communication system 112 may include multiple systems configured to respectively use multiple protocols for communication.

The proximity communication system 112 is used to trigger handover between the wireless domain 102 and the wireless domain 104. In one embodiment, the proximity communication system 112 is configured to broadcast a signal (referred to as a "proximity signal") associated with the wireless domain 104. In one embodiment, the proximity signal may be a readable passive signal that can be detected or read by the wireless device 106. Alternatively, the wireless device 106 may broadcast the proximity signal, which is detected by the proximity communication system 112. In yet another embodiment, the wireless device 106 and the proximity communication system 112 transmit and receive proximity signals periodically to facilitate different modes of handover including, but not limited to, mobile assisted and network controlled handovers. For a network controlled handover, the proximity communication system 112 may be connected to the wireless control system 108 and/or the wireless control system 110.

The proximity signal may carry various data that identifies the wireless domain 104, the wireless domain 102, or both of the wireless domains 102 and 104 to the wireless device 106. That is, the proximity signal has a specific "signature" that the wireless device 106 can use to determine the appropriate wireless domain for handover. The wireless device 106 detects the proximity signal if the wireless device enters the service area 117 and identifies the signature thereof. In response to detection of the proximity signal, and based on the signature thereof, the wireless device 106 is configured to request a handover from one of the wireless domains 102 and 104 to the other. Alternatively, an indication of that the proximity signal has been detected may be transmitted from the proximity communication system 112 to the wireless control system 110 and/or the wireless control system 108, which in turn triggers the handover process for the wireless device 106 (i.e., network initiated handover).

For example, if the wireless device 106 is currently in communication with the wireless domain 102, the wireless device 106 requests a handover from the wireless domain 102 to the wireless domain 104. Conversely, if the wireless device 106 is currently in communication with the wireless domain 104, the wireless device 106 requests a handover from the wireless domain 104 to the wireless domain 102. The handover process is controlled by the wireless control system 108 and/or the wireless control system 110, depending on the configuration of the wireless domains 102 and 104. Handover between wireless domains is well known in the art.

In this manner, precise delineation of the handover boundary between the wireless domain 102 and the wireless domain 104 is provided. Such precise delineation of handover boundaries facilitates the use of differentiated service, differentiated radio access method or network, and pricing by a service provider. For example, calls made by the wireless device 106 using the wireless domain 102 may be charged at a different rate than those made using the wireless domain 104. Since handover is triggered based on presence of the wireless device 106 in the service area 117 of the proximity communication system 112, the handover may be more precisely controlled vis-a-vis conventional signal-level based handovers. Those skilled in the art will appreciate, however, that the handover process of the invention may be used in combination with other methods of handover, such as signal-level based handover.

Figure 2:
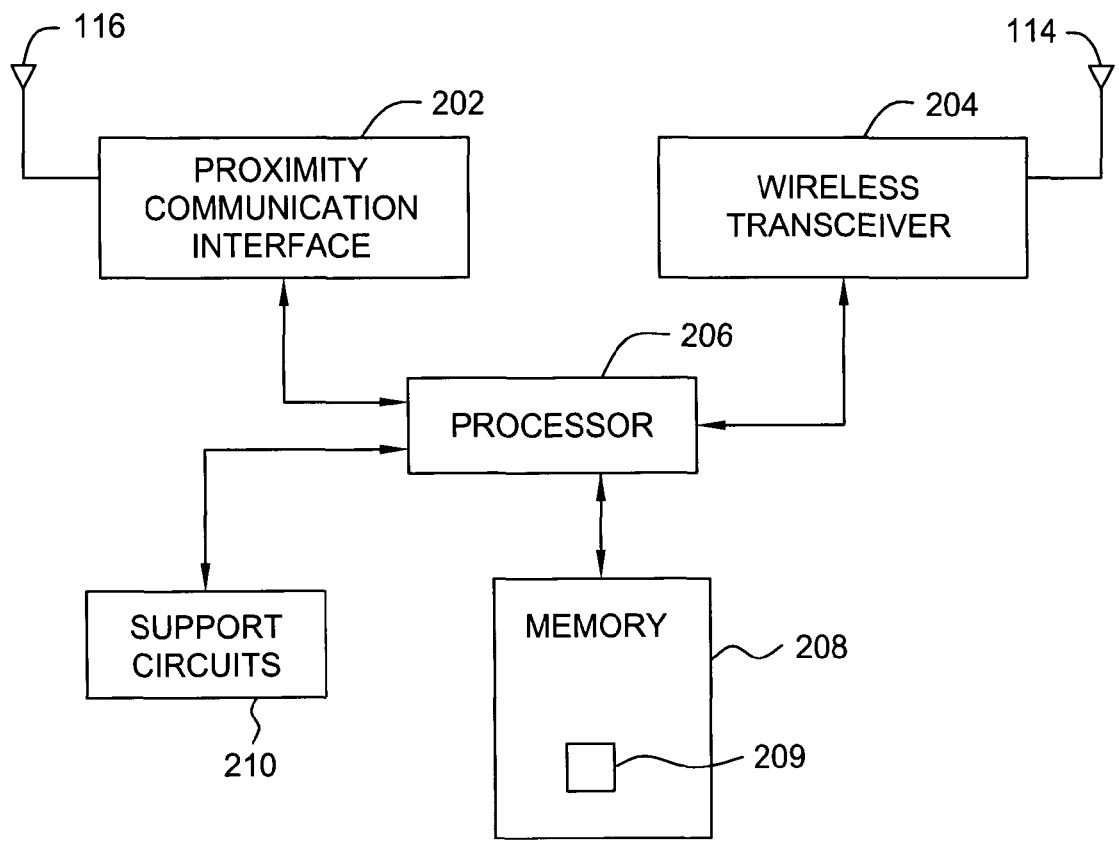
FIG. 2 is a block diagram depicting an exemplary embodiment of a wireless device of FIG. 1 constructed in accordance with one or more aspects of the invention.

FIG. 2 is a block diagram depicting an exemplary embodiment of the wireless device 106 constructed in accordance with one or more aspects of the invention. The wireless device 106 includes a proximity communication interface 202, a wireless transceiver 204, a processor 206, a memory 208, and support circuits 210. The proximity communication interface 202 to transmit proximity signals, receive proximity signals, or both via the antenna 116. The proximity communication interface 202 receives proximity signals from, or transmits proximity signals to, the proximity communication system 112. For example, the proximity communication interface 202 may comprise an NFC interface, an RF ID interface, a BLUETOOTH interface, optical interface, or a like type short-range wireless communication interface known in the art, as well as combinations of such interfaces. The wireless transceiver 204 is configured to receive wireless signals from the wireless domain 102 and the wireless domain 104 via the antenna 114. For example, the wireless transceiver 204 may comprise a GSM transceiver, a CDMA transceiver, a UMTS transceiver, a PDC transceiver, a WLAN transceiver (e.g., IEEE 802.11 transceiver) or a like type wireless transceiver known in the art, as well as combinations of such transceivers. The proximity communication interface 202 and the wireless transceiver 204 are controlled by the processor 206.

The processor 206 may comprise a microprocessor, instruction-set processor (e.g., a microcontroller), or like type processing element known in the art. The processor 206 is coupled to the memory 208 and the support circuits 210. The memory 208 may be random access memory, read only memory, removable storage, hard disc storage, or any combination of such memory devices. Various processes and methods described herein may be implemented via software stored in the memory 208 for execution by the processor 206. Alternatively, such processes and methods may be implemented using dedicated hardware, such as an application specific integrated circuit (ASIC), or a combination of hardware and software. The support circuits 210 include conventional cache, power supplies, clock circuits, data registers, I/O circuitry, and the like to facilitate operation of the wireless device 106.

Figure 4:
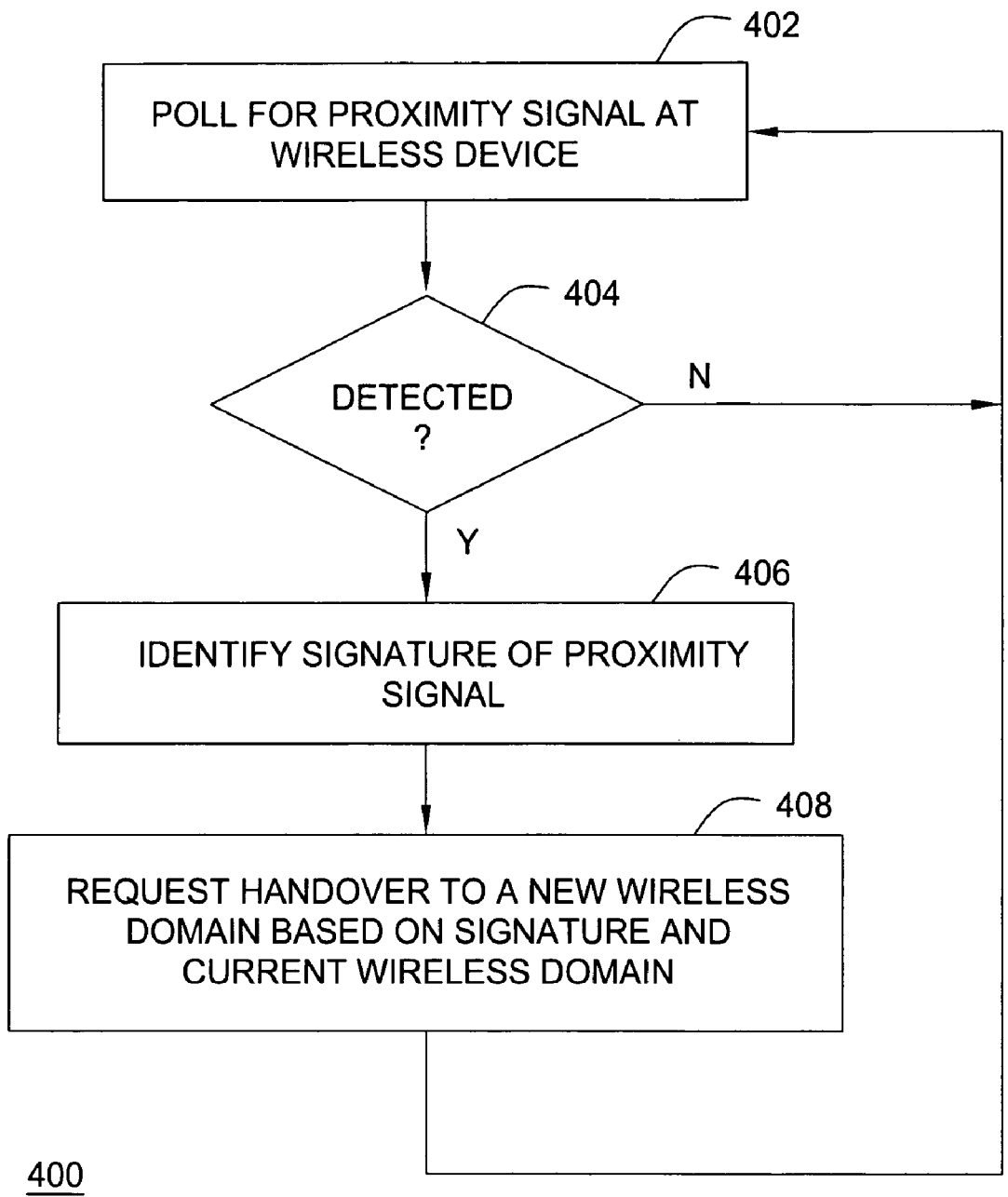
FIG. 4 is a flow diagram depicting an exemplary embodiment of a method for requesting handovers between wireless domains in accordance with one or more aspects of the invention.

Notably, the memory 208 includes software 209 for requesting handovers between wireless domains. In particular, FIG. 4 is a flow diagram depicting an exemplary embodiment of a method 400 for requesting handovers between wireless domains in accordance with one or more aspects of the invention. The method 400 begins at step 402, where the wireless device 106 polls for proximity signals. For example, the proximity communication interface 202 may be configured to periodically poll for proximity signals. At step 404, a determination is made whether a proximity signal has been detected. If not, the method 400 returns to step 402. If so, the method 400 proceeds to step 406. At step 406, the signature of the proximity signal is identified. At step 408, a handover to a new wireless domain is requested based on the signature and the current wireless domain. The method 400 then returns to step 402. Alternatively, the software 209 may be implemented within the proximity communication system 112 if the proximity communication system 112 is used for handover initiation linking to the wireless control systems 108 and 110.

Figure 3:
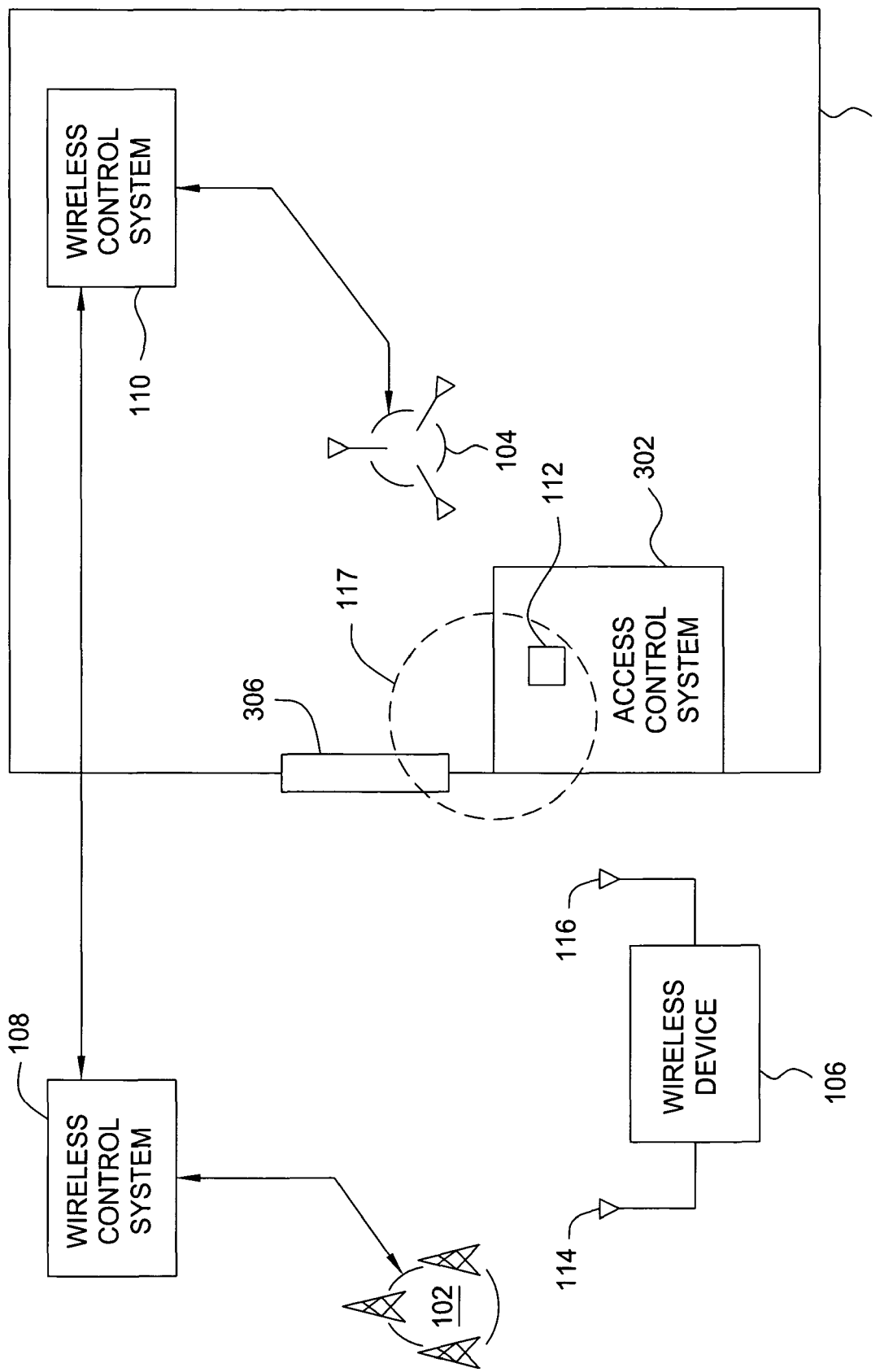
FIG. 3 is a block diagram depicting another exemplary embodiment of a wireless communication system constructed in accordance with one or more aspects of the invention.

FIG. 3 is a block diagram depicting another exemplary embodiment of a wireless communication system 300 constructed in accordance with one or more aspects of the invention. Elements in FIG. 3 that are the same or similar to those of FIG. 1 are designated with identical reference numerals and are described in detail above. In the present embodiment, the proximity communication system 112 is disposed in an access control system 302 of a building 304. In particular, the building 304 includes an access passage 306 that is controlled for security purposes by the access control system 302. The access control system 302 uses the proximity communication system 112 to communicate with the wireless device 106 to authorize ingress to and/or egress from the building, or parts of a building, or a campus (referred to as "building 304"). Such access control systems are well known in the art.

In one embodiment, access to and/or from the building 304 through the access passage 306 is controlled by placing the wireless device 106 in proximity to the access control system 302 (e.g., within the service area 117 of the proximity communication system 112). Since the wireless device 106 is placed in proximity with the access control system 302, the wireless device 106 detects the proximity signal broadcast by the proximity communication system 112. The proximity signal is used to trigger handover between the wireless domains 102 and 104, as described above. For example, before entering the building 304, the wireless device 106 may be in communication with the wireless domain 102. As the wireless device 106 is used to gain access to the building 304, the wireless device 106 detects the proximity signal and requests a handover to the wireless domain 104. As the wireless device 106 is used to exit the building 304, the wireless device again detects the proximity signal and requests a handover to the wireless domain 102.

While the foregoing is directed to embodiments of the present invention, other and further embodiments of the invention may be devised without departing from the basic scope thereof, and the scope thereof is determined by the claims that follow.

The invention claimed is:

1. A method of handover between a first wireless domain and a second wireless domain, comprising:
    detecting a signal employing a short-range wireless protocol at a wireless device, the signal including a signature identifying at least one of the first or second wireless domains;
    determining a direction of handover between the first wireless domain and the second wireless domain based on the signature in the signal; and
    requesting, in response to the signal, a handover between the first wireless domain and the second wireless domain in the direction as determined.

2. The method of claim 1, further comprising: broadcasting the signal within a localized zone;
    wherein the signal is detected in response to the wireless device being located within the localized zone.

3. The method of claim 1, wherein the signal is a passive signal detectable within a localized zone, and wherein the signal is detected in response to the wireless device being located within the localized zone.

4. The method of claim 1, wherein the the step of determining comprises:
    identifying one of the first and second wireless domains with which the wireless device is in communication;
    identifying another of the first and second wireless domains from the signature; and
    defining the direction as from the one of the first and second wireless domains to the other of the first and second wireless domains.

5. The method of claim 1, wherein the signal is configured for controlling access to a building.

6. The method of claim 1, wherein the short-range wireless protocol comprises one of a near-field communication (NFC) protocol, a radio frequency identification (RFID) protocol, an optical protocol, and a BLUETOOTH protocol.

7. The method of claim 1, wherein each of the first wireless domain and the second wireless domain comprises one of a global system for mobile communications (GSM) network, a code division multiple access (CDMA) network, a universal mobile telecommunications system (UMTS) network, a personal digital cellular network, and a wireless local area network (WLAN).

8. A wireless device, comprising:
a proximity communication interface for detecting a signal employing a short-range wireless protocol, the signal including a signature identifying at least one of a first wireless domain or a second wireless domain; and
a processor for determining a direction of handover between the first wireless domain and the second wireless domain based on the signature in the signal, and for requesting, in response to the signal, a handover between the first wireless domain and the second wireless domain in the direction as determined.

9. The apparatus of claim 8, wherein the proximity communication interface is configured to detect the signal in response to the wireless device being located in a localized zone.

10. The apparatus of claim 9, wherein the signal comprises a passive signal.

11. The apparatus of claim 8, wherein the processor is further configured to:
identify one of the first and second wireless domains with which the wireless device is in communication;
identify another one of the first and second wireless domains from the signature; and
define the direction as from the one of the first and second wireless domains to the other of the first and second wireless domains.

12. The apparatus of claim 8, wherein the signal is configured for controlling access to a building.

13. The apparatus of claim 8, wherein the short-range wireless protocol comprises one of a near-field communication protocol (NFC), a radio frequency identification (RFID) protocol, an optical protocol, and a BLUETOOTH protocol.

14. The apparatus of claim 8, wherein each of the first wireless domain and the second wireless domain comprises one of a global system for mobile communications (GSM) network, a code division multiple access (CDMA) network, a universal mobile telecommunications system (UMTS) network, a personal digital cellular network, and a wireless local area network (WLAN).

15. A wireless communication system, comprising:
a first wireless domain;
a second wireless domain;
a proximity communication system for broadcasting a signal employing a short-range wireless protocol in a service area, the signal including a signature identifying at least one of the first or second wireless domains; and
a wireless device having a proximity communication interface for detecting the signal and a processor for determining a direction of handover between the first wireless domain and the second wireless domain based on the signature in the signal, and for requesting a handover between the first wireless domain and the second wireless domain in the direction as determined.

16. The systems of claim 15, wherein the processor is further configured to:
identify one of the first and second wireless domains with which the wireless device is in communication;
identify another one of the first and second wireless domains from the signature; and
define the direction as from the one of the first and second wireless domains to the other of the first and second wireless domains.

17. The system of claim 15, further comprising:
an access control system configured to control access to a building; wherein the proximity communication system is disposed in the access control system.

18. The system of claim 17, wherein the signal is configured for controlling access to the building.

19. The system of claim 15, wherein the short-range wireless protocol comprises one of a near-field communication protocol (NFC), a radio frequency identification (RFID) protocol, an optical protocol, and a BLUETOOTH protocol.

20. The system of claim 15, wherein each of the first wireless domain and the second wireless domain comprises one of a global system for mobile communications (GSM) network, a code division multiple access (CDMA) network, a universal mobile telecommunications system (UMTS) network, a personal digital cellular network, and a wireless local area network (WLAN).

* * * * *